(12) United States Patent
Charpentier et al.

(10) Patent No.: US 9,575,172 B2
(45) Date of Patent: Feb. 21, 2017

(54) HANDHELD MULTI-SENSOR SYSTEM FOR SIZING IRREGULAR OBJECTS

(71) Applicant: UNIQUE SOLUTIONS DESIGN LTD., Dartmouth (CA)

(72) Inventors: Albert Charpentier, Malvern, PA (US); Michael Boylan, Phoenixville, PA (US); Robert Kutnick, Boca Raton, FL (US); Kent Worsnop, Lawrencetown (CA); Young Harvill, Half Moon Bay, CA (US)

(73) Assignee: Bodidata, Inc., St. Petersburg, FL (US)

( * ) Notice: Subject to any disclaimer, the term of this patent is extended or adjusted under 35 U.S.C. 154(b) by 0 days.

(21) Appl. No.: 14/969,095

(22) Filed: Dec. 15, 2015

(65) Prior Publication Data

US 2016/0178747 A1 Jun. 23, 2016

Related U.S. Application Data

(63) Continuation of application No. PCT/IB2015/002166, filed on Jun. 30, 2015.

(60) Provisional application No. 62/019,023, filed on Jun. 30, 2014.

(51) Int. Cl.
*G01S 13/89* (2006.01)
*G01S 13/88* (2006.01)
*G01S 13/86* (2006.01)
*G01S 13/46* (2006.01)

(52) U.S. Cl.
CPC ............ *G01S 13/89* (2013.01); *G01S 13/86* (2013.01); *G01S 13/865* (2013.01); *G01S 13/867* (2013.01); *G01S 13/88* (2013.01); *G01S 13/887* (2013.01); *G01S 2013/466* (2013.01)

(58) Field of Classification Search
CPC ........ G01S 13/89; G01S 13/86; G01S 13/865; G01S 13/867; G01S 13/88; G01S 13/887
USPC ................................................. 342/22, 52–54
See application file for complete search history.

(56) References Cited

U.S. PATENT DOCUMENTS

| | | | | |
|---|---|---|---|---|
| 4,984,073 A | * | 1/1991 | Lemelson | B07C 5/10 348/130 |
| 5,081,456 A | * | 1/1992 | Michiguchi | G01S 13/0209 342/181 |
| 5,198,877 A | | 3/1993 | Schulz | |
| 6,359,582 B1 | * | 3/2002 | MacAleese | G01S 7/417 342/192 |

(Continued)

OTHER PUBLICATIONS

International Search Report and Written Opinion issued Feb. 17, 2016 in International Patent Application No. PCt/IB2015/002166 (8 pages).

*Primary Examiner* — Peter Bythrow
(74) *Attorney, Agent, or Firm* — Fox Rothschild LLP (57) ABSTRACT

A handheld scanner system for obtaining sizing of an irregularly shaped object. The system includes a housing and an inertial measurement unit configured to record orientation and displacement history of the housing. An optical module includes at least one 3D optical sensor configured to generate a 3D point cloud of information about the object. A radar module includes at least one radar sensor configured to sense spacing between the housing and the object. A processor receives data from the inertial measurement unit, the optical module and the radar module and creates a map representing the object based on the received data.

18 Claims, 7 Drawing Sheets

(56) References Cited

U.S. PATENT DOCUMENTS

| | | | | |
|---|---|---|---|---|
| 6,417,797 B1* | 7/2002 | Cousins | | G06F 15/02 342/175 |
| 6,542,249 B1 | 4/2003 | Kofman et al. | | |
| 6,967,612 B1* | 11/2005 | Gorman | | G01S 7/024 342/175 |
| 6,972,714 B1* | 12/2005 | Baharav | | G01N 22/00 342/175 |
| 7,209,035 B2* | 4/2007 | Tabankin | | G08B 13/19656 340/539.11 |
| 7,256,899 B1 | 8/2007 | Faul et al. | | |
| 7,365,672 B2* | 4/2008 | Keller | | G01N 21/3581 342/179 |
| 7,408,461 B2* | 8/2008 | Fluck | | G01V 3/081 324/243 |
| 7,492,303 B1* | 2/2009 | Levitan | | G01S 7/024 342/188 |
| 7,504,993 B2* | 3/2009 | Young | | G01S 7/4026 342/175 |
| 7,844,081 B2* | 11/2010 | McMakin | | G01S 13/887 382/115 |
| 7,940,208 B2* | 5/2011 | Baharav | | G01N 22/00 342/175 |
| 8,368,586 B2* | 2/2013 | Mohamadi | | G01S 7/026 342/147 |
| 8,773,946 B2* | 7/2014 | Padmanabhan | | G01C 15/00 367/7 |
| 8,996,228 B1* | 3/2015 | Ferguson | | G01C 21/3461 348/118 |
| 2004/0041724 A1* | 3/2004 | Levitan | | F41H 13/00 342/22 |
| 2005/0270220 A1* | 12/2005 | Baharav | | G01N 22/00 342/22 |
| 2006/0066469 A1* | 3/2006 | Foote | | G01S 13/003 342/22 |
| 2007/0001895 A1* | 1/2007 | Kolinko | | G01V 8/005 342/22 |
| 2008/0036644 A1* | 2/2008 | Skultety-Betz | | G01S 7/032 342/22 |
| 2008/0284636 A1* | 11/2008 | Hausner | | G01V 3/12 342/22 |
| 2009/0073023 A1* | 3/2009 | Ammar | | G01S 17/89 342/22 |
| 2009/0195435 A1* | 8/2009 | Kapilevich | | G01S 7/032 342/22 |
| 2009/0284405 A1* | 11/2009 | Salmon | | G01K 11/006 342/22 |
| 2009/0310117 A1* | 12/2009 | Pook | | G01S 13/88 356/4.01 |
| 2009/0323121 A1 | 12/2009 | Valkenburg et al. | | |
| 2010/0117885 A1* | 5/2010 | Holbrook | | H04N 1/107 342/22 |
| 2010/0214150 A1* | 8/2010 | Lovberg | | G01K 11/006 342/22 |
| 2011/0026772 A1* | 2/2011 | Hagan | | H04N 19/124 382/104 |
| 2011/0102234 A1* | 5/2011 | Adams | | G01S 13/888 342/22 |
| 2012/0194376 A1* | 8/2012 | Daly | | G01S 13/887 342/22 |
| 2012/0293355 A1* | 11/2012 | Marianer | | G01S 7/024 342/22 |
| 2012/0306681 A1* | 12/2012 | Elad | | G01S 13/867 342/27 |
| 2013/0021192 A1* | 1/2013 | Daly | | G01V 3/15 342/22 |
| 2014/0168007 A1* | 6/2014 | Wang | | G01S 13/89 342/179 |
| 2014/0168013 A1* | 6/2014 | Wang | | G01S 13/887 342/385 |
| 2014/0368373 A1* | 12/2014 | Crain | | G01S 5/02 342/5 |
| 2014/0376821 A1* | 12/2014 | Meir | | G01S 17/50 382/218 |
| 2016/0161600 A1* | 6/2016 | Eldada | | G01S 17/023 356/5.01 |
| 2016/0223647 A1* | 8/2016 | Nichols | | G01S 7/10 |

* cited by examiner

HANDHELD MULTI-SENSOR SYSTEM FOR SIZING IRREGULAR OBJECTS

The present application claims priority to PCT International Application No. PCT/IB2015/002166, filed Jun. 30, 2015, which claims the benefit of U.S. Provisional Application No. 62/019,023, filed on Jun. 30, 2014, the contents of which are incorporated herein by reference.

FIELD OF THE INVENTION

This invention relates to a handheld scanner system. More particularly, the invention relates to a handheld scanner utilizing a multi-sensor system for sizing irregularly shaped objects. In one exemplary embodiment, the handheld scanner is utilized to measure a shopper's dimensions for determining best fit garments.

BACKGROUND OF THE INVENTION

Clothing shoppers today are confronted with the dilemma of having an expansive number of choices of clothing style, cut and size and not enough information regarding their size and how their unique body proportions will fit into the current styles.

Unique Solutions builds a 3D body scanner, which is capable of collecting 200,000 circumferential range measurements of a subject which are used to provide sizing recommendations for various garments. The fundamental range processing element in this system consists of an ultra wide band (UWB) linear frequency modulated (LFM) chirp radar. The technique of performing LFM and the use of such technology in a kiosk-based measurement system are discussed in U.S. Pat. Nos. 7,298,317; 6,507,309; 5,455,590; 5,557,283; and 5,859,609 and Canadian patent CA 2359513, which are incorporated herein by reference.

While a kiosk-based system has proven extremely beneficial, it does have some limitations. For example, it has limited portability. Additionally, the kiosk-based system may have difficulty measuring surfaces having high angle of incidence with respect to the normal of the scanner, and hence loss of information for these surfaces.

There is a need for a handheld scanner system that facilitates measurement of an irregularly shaped object, which may in one exemplary embodiment be utilized to assist shoppers with garment fit.

SUMMARY OF THE INVENTION

In the application of garment fit, a limitation of the 3d optical-only system when scanning a fully clothed individual is that it is only capable of mapping the external garment and it obtains little knowledge of the underlying body dimensionality. The optical-only measurements necessitate performing algorithmic approximations of the body which yield inaccurate body measurement estimates.

A solution to this problem is the integration of the 3d optical system with that of a radar system, for example, a millimeter wave radar system, capable of making precise measurements to the body. This configuration is desirable as the radar ranging system and optical system to independently collect range information but the systems can operate independent of each other and do not interfere with each other. Additionally, the radar energy penetrates the outer garment, reflects off of the body and returns to a receiver wherein an accurate range determination to the body can be made. The system can be further described by using the optical 3D system to build a 3D point cloud of the target object. The 3D point cloud is used a starting framework to limit the range of interest for the radar data. Since the radar data can have multiple solutions for the target body range, the optical 3D point cloud limits the solution for the range information to an area near the outer clothing to enable the distance to the skin to be more accurately determined. The optical system maintains an inertial state vector with respect to a fixed coordinate reference frame and with respect to the body. The state information which includes orientation, translation and rotation of the unit is used along with the known physical offsets of the antenna elements with respect to the handled center of gravity to provide corrections and update range estimates for each virtual antenna. The inertial information can be obtained from the on-board intertial measurement unit (IMU) which is sensitive to physical forces and/or the optical camera system processing which can make corrections of translation and rotations with respect to the body.

Successful garment fitting requires accurate knowledge of body measurements, and for the human body, several critical volumetric differences exist between the garment and the body. The handheld system described herein is capable of identifying these regions and is equipped to process/fuse the optical and radar data streams to yield an accurate 3d representation of the individual's body. The system resolves both the garment volume and the body volume, from which circumference data can be extracted and measurements made for the purpose of garment fitting. The measurement process is coordinated by a processing element which manages the collection, association, processing and storage of radar and optical data.

In at least one embodiment, the present invention provides a handheld scanner system for obtaining sizing of an irregularly shaped object. The system includes a housing which houses an optical module, which includes at least one 3D optical sensor configured to generate a 3D point cloud of information about the object and a radar module, which includes at least one radar sensor configured to determine spacing between the housing and the object. A processor receives data from the optical module and the radar module and uses all available sensor input to create the necessary depth maps representing the object based on the received data.

In at least one embodiment, the body surface map representing the volume of the object is utilized for garment sizing for an individual.

In at least one embodiment, the hand-held body scanner offers a way in which a shopper's dimensions can quickly be measured from which informed decisions can be made as to which garments in a collection of custom-measured clothing or garments of known dimensionality which would make for the best fit. A hand-held system offers the opportunity to make these difficult measurements as an operator can follow the body's contour and repeat measurements if necessary.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Figure 1:
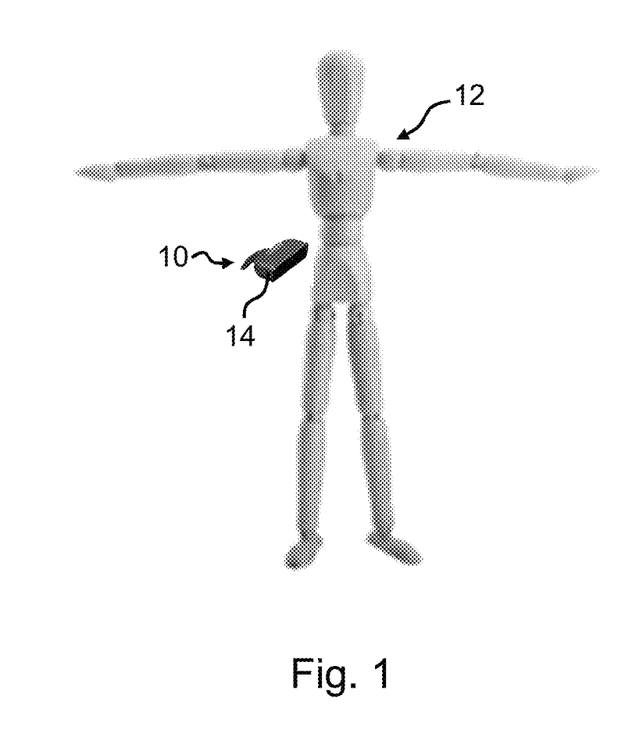
FIG. 1 is a perspective view illustrating an exemplary handheld scanner system positioned relative to an exemplary irregular object.
Figure 2:
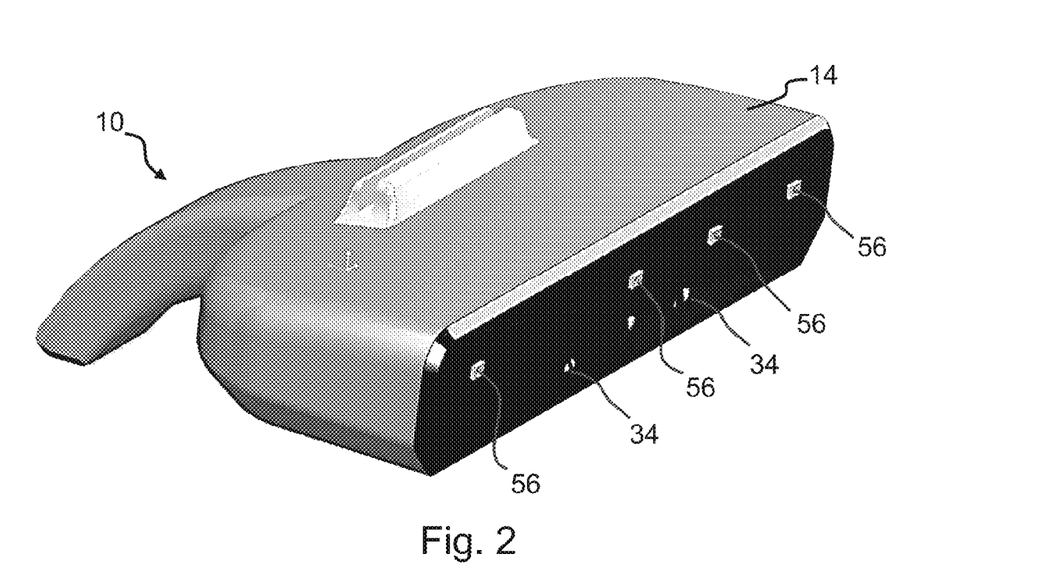
FIG. 2 is a front perspective view of an exemplary handheld scanner system in accordance with an embodiment of the invention.
Figure 3:
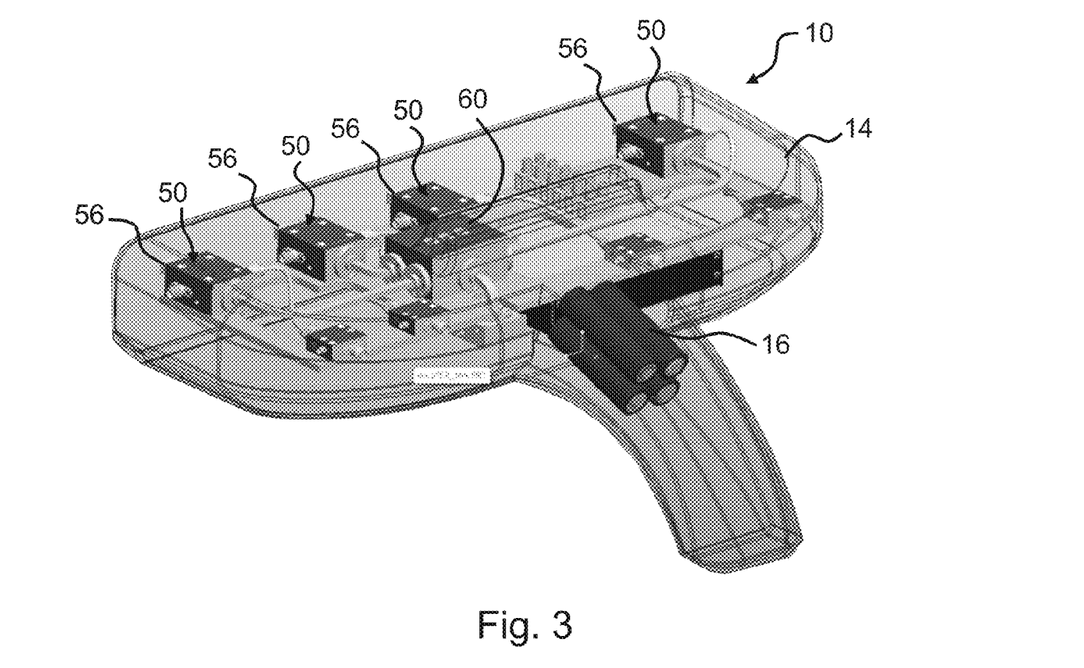
FIG. 3 is a rear perspective view of the handheld scanner system of FIG. 3 with the housing shown transparently.

Referring to FIGS. 1-4, a handheld scanner system 10 in accordance with an exemplary embodiment of the invention will be described. Referring to FIG. 1, the handheld scanner system 10 is illustrated positioned relative to an irregularly shaped object 12, which in the illustrated application is an individual. The handheld scanner system 10 preferably includes a housing 14 in which the various components described below are housed. The housing 14 may have various configurations and is preferably configured to fit comfortably in an operator's hand. A brace or support piece (not shown) may extend from the housing 14 to assist the operator in supporting the system 10 relative to the object 12. During operation, the system 10 will be moved about the object 12 in close proximity to the object, for example, 12" to 18" inches from the object. The housing 14 is preferably made of durable plastic material and the sections which are in the vicinity of the antenna elements, are transparent to the radar frequencies of operation.

Figure 4:
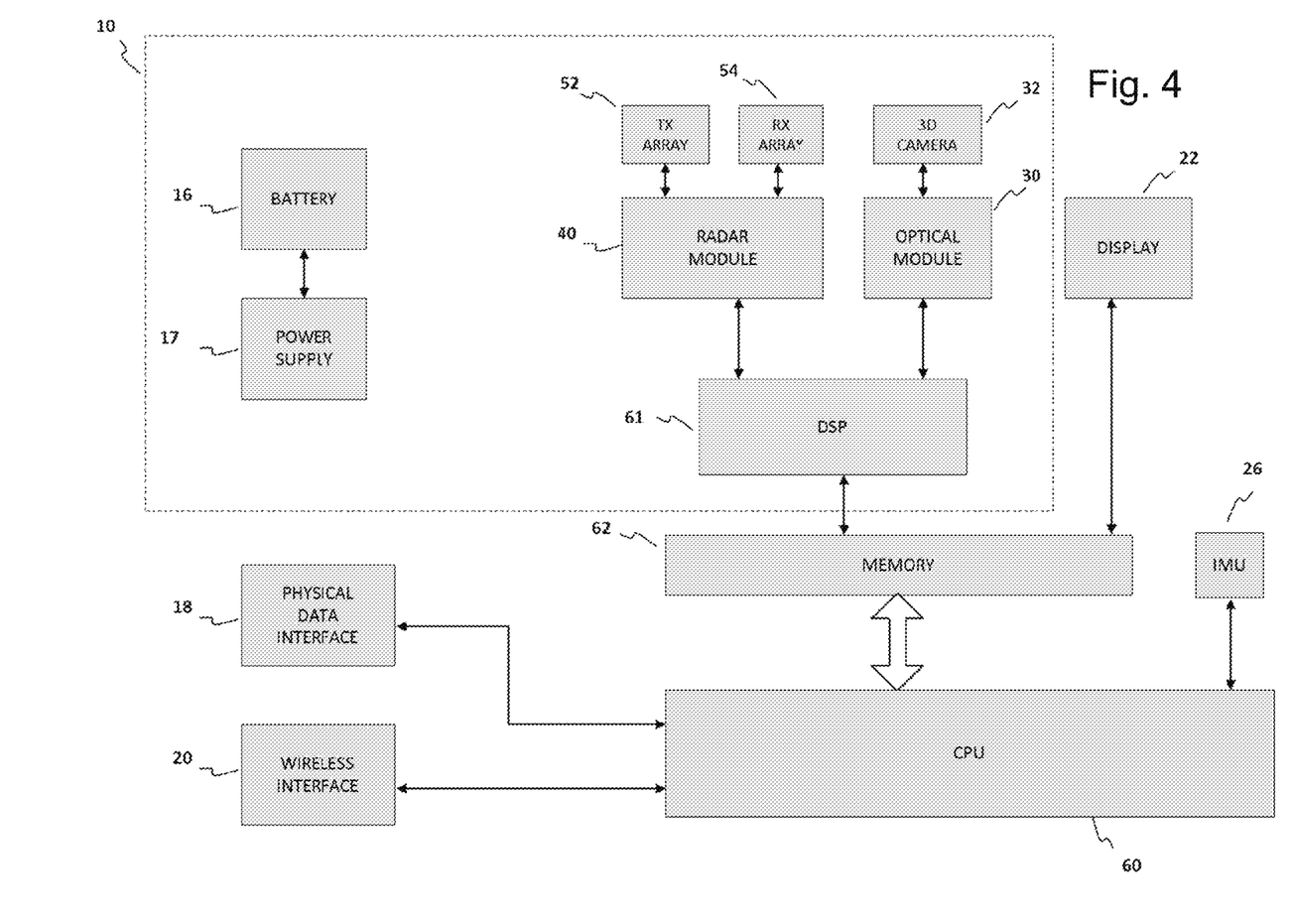
FIG. 4 is a block diagram of an exemplary handheld scanner system.

Referring to FIG. 4, a small display 22 may be built into the housing 14 or may be external to the housing 14 while being visible to the operator during a scan. The display 22 can also be configured to perform basic data entry tasks such as responding to prompts, entering customer information as well as receive diagnostic information concerning the state of the handheld device. Additionally the handheld unit 14 may also incorporate feedback (haptic, auditory, visual, etc.) to the operator, which will, for example, direct the operator to locations of the customer which need to be scanned.

The system 10 is preferably powered by a rechargeable battery 16, for example, a high energy density, lightweight battery such as Lithium Polymer, or power supply 17. The battery system can be interchangeable to support long-term or continuous operation. The system 10 preferably is docked in a cradle (not shown) when not in use. While docked, the cradle shall provide re-charging capabilities as well as providing an interface for wired connectivity to external computer equipment. The device preferably supports both a wired and a wireless interface 18, 20. Preferably the housing 14 includes a physical interface 18 which will allow for power, high-speed transfer of data, as well as device programming or updating. The wireless interface 20 may be, for example, a 802.11n interface, and provides a general operation communication link to exchange measurement data (radar and image data) to auxiliary computer equipment, for example, an external host device, for rendering of the image to the display of an operator's terminal. For manufacturing and testing purposes, an RF test port may be included for calibration of the RF circuitry.

The exemplary system 10 preferably utilizes two modes of measurement, namely, an optical module 30 and radar module 40. The data from both modules 30, 40 is streamed into a processing engine 60 wherein the optical and radar streams are co-processed, aligned and results delivered to a mobile computing device or other auxiliary computer equipment for display. A digital signal processor (DSP) 61 may also be included. Subsequent measurement extraction can operate on the 3D data and extracted results can be supplied to a garment fitting engine. An alternative embodiment will send optical data to the radar unit which will interleave the optical with the radar data and provide a single USB connection to the host processor. The optical data can also be written to an external memory to buffer optical data frames. An electronic memory 62 temporarily stores range information from previous scans. The stored data from prior scans can augment processing with current samples as the radar moves about the subject to obtain a refined representation of the body and determine body features via Doppler processing or moving target indicator (MTI) algorithms. The system 10 allows the host platform to use both the optical and radar system to determine two surfaces of an individual, i.e. the garment surface and the wearer's body surface. The radar unit may also parse the optical range data and use this information to solve for range solutions and eliminate ghosts or range ambiguity.

The optical module 30 includes a 3D camera 32 which is configured such that the integrated 3D data structure provides a 3D point cloud (garment and body), regions of volumetric disparity (as specified by operator), and a statistical representation of both surfaces. The 3D camera 32 generally includes at least two spaced apart lenses 34 which are each configured to capture an image and the captured images from spaced perspectives are integrated to form the 3D image. Such 3D optical camera systems are widely available from a number of manufacturers, for example the Intel Real Sense 3D optical camera scanner system, and have recently been integrated into mobile devices.

The optical system maintains an inertial state vector with respect to a fixed coordinate reference frame and with respect to the body. The state information which includes orientation, translation and rotation of the unit is used along with the known physical offsets of the antenna elements with respect to the handled center of gravity to provide corrections and update range estimates for each virtual antenna. The inertial information can be obtained from the on-board inertial measurement unit (IMU) 26 which is sensitive to physical forces and/or the optical camera system processing which can make corrections of translation and rotations with respect to the body.

The capabilities of such systems routinely achieve millimeter accuracy and resolution at close distances and increase to centimeter resolution at further distances. Despite their excellent resolution, obtaining body dimensionality of a clothed individual is limited by any obstruction such as a garment. Camera systems which project a pattern on the subject provide adequate performance for this application.

Figure 5:
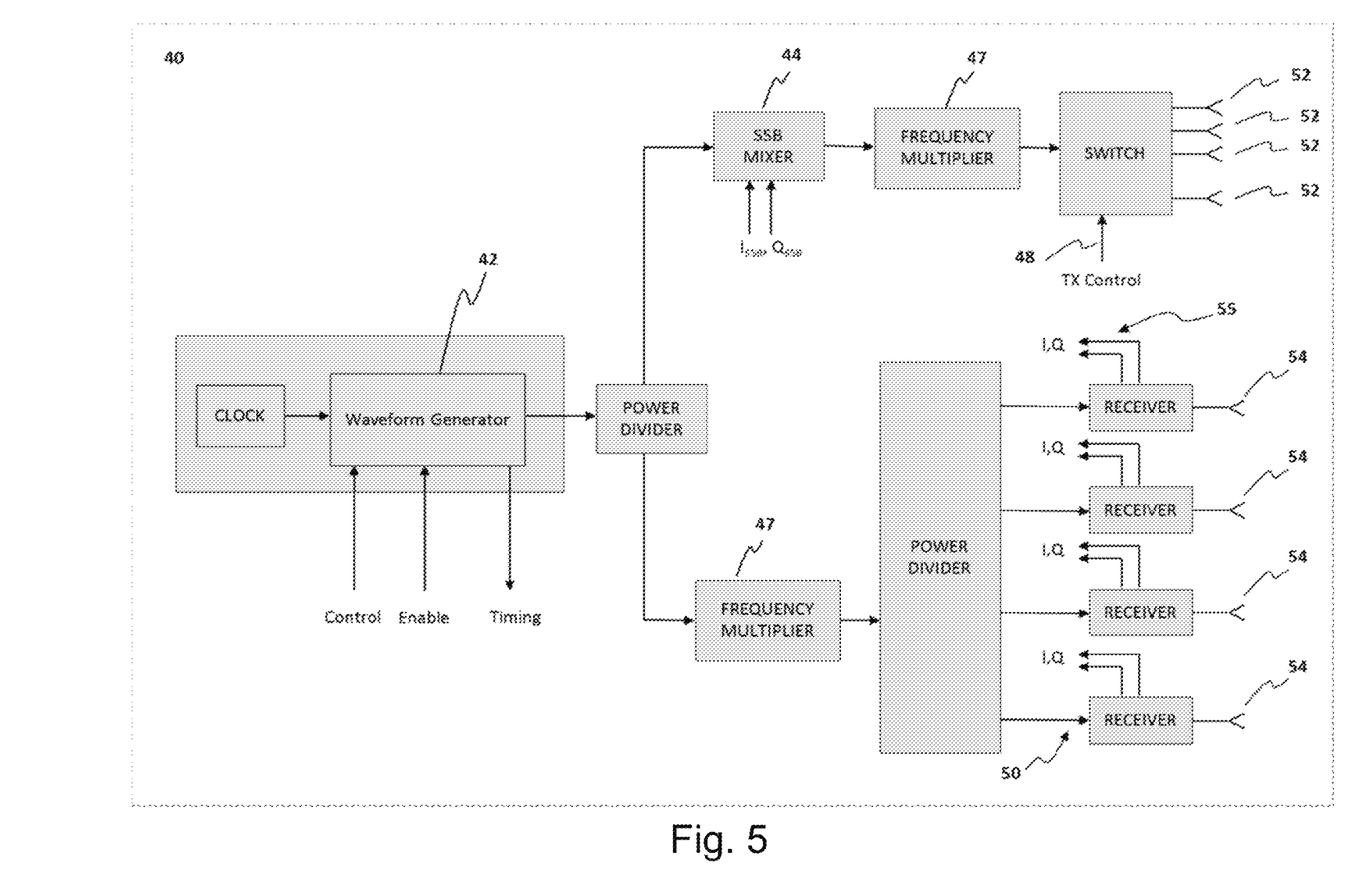
FIG. 5 is block diagram of an exemplary waveform radar unit.

Referring to FIG. 5, the radar module 40 generally comprises a waveform generator 42 capable of producing a suitable waveform for range determination; one or more antenna assemblies 50 with at least one transmitting element (emitter) 52 and at least one receiving element (receiver) 54; a frequency multiplier 47, a transmit selection switch 48 and a down-converter (stretch processor) 46 which is a matched filter which provides a beat frequency by comparing the instantaneous phase of the received target waveform with that of a replica of the transmitted signal, via the quadrature outputs 55. An SSB mixer 44 may be included to perform up-conversion to impart constant frequency shift. This functional block is not mandatory but a design enhancement to combat issues with feedthrough.

It is noted that the preferred waveform is a linear frequency modulated (LFM) chirp pulse, however, other waveforms may be utilized. To achieve high range resolution, the radar is preferably an extremely broadband system. An exemplary radar module may be, for example, an X/Ku-band operation. The LFM system preferably includes a delayed replica of the transmission burst to make a comparison with the return pulse. In the kiosk-based system, this delay is calibrated and fixed due to a relatively stationary target and a radar platform which rotates on a fixed armature. Due to the fact that the operator using a hand-held scanner cannot reliably maintain a fixed separation from the subject, a laser range finder, optical system or other proximity sensor can aid in tracking this separation to the subject's outer garment. This information will be used to validate the radar measurements made using the LFM system and compensate the delay parameters accordingly. Since the optical 3d camera or laser cannot measure to the skin, the UWB radar is responsible for making this measurement.

With the illustrated radar module 40, the waveform generator 42 emits a low power non-ionizing millimeter wave operating between 69-75 GHz which passes through clothing and reflects off of the skin and returns a scattered response to the radar receiving aperture. To resolve the range, the ultra-wideband radar unit consists of two or more co-linear antenna elements 52, 54 having a known spatial separation. This embodiment uses four apertures 56 with associated transmitting elements 52 and receiving elements 54 having a relative spacing of 1:1:2 (for example, 3 inches to 3 inches to 6 inches between elements); however different arrangements are possible to meet both geometric and cost objectives. In the case of multiple transmit apertures 56, each element takes a turn as the emitter, and other elements are receivers. A single aperture 56 can be used for both transmitting and receiving; but a dual aperture can also be used to achieve high isolation between transmit and receive elements for a given channel. Additionally, the antennas 50 can be arranged to transmit with specific wave polarizations to achieve additional isolation or to be more sensitive to a given polarization sense as determined by the target. This embodiment uses separate waveguide rectangular horn apertures milled into an Aluminum housing having the same vertical polarization. All antenna selections are accomplished via an electronic switch 48 under computer control.

The waveform emitted in the direction of the body is a linear frequency modulated (LFM) ramp which sweeps across several Gigahertz of bandwidth. The waveform can be the same for all antenna pairs or it can be changed to express features of the reflective surface. The bandwidth determines the unambiguous spatial resolution achievable by the radar. Other radar waveforms and implementations can be used, but this embodiment utilizes an LFM triangular waveform.

Figure 6:
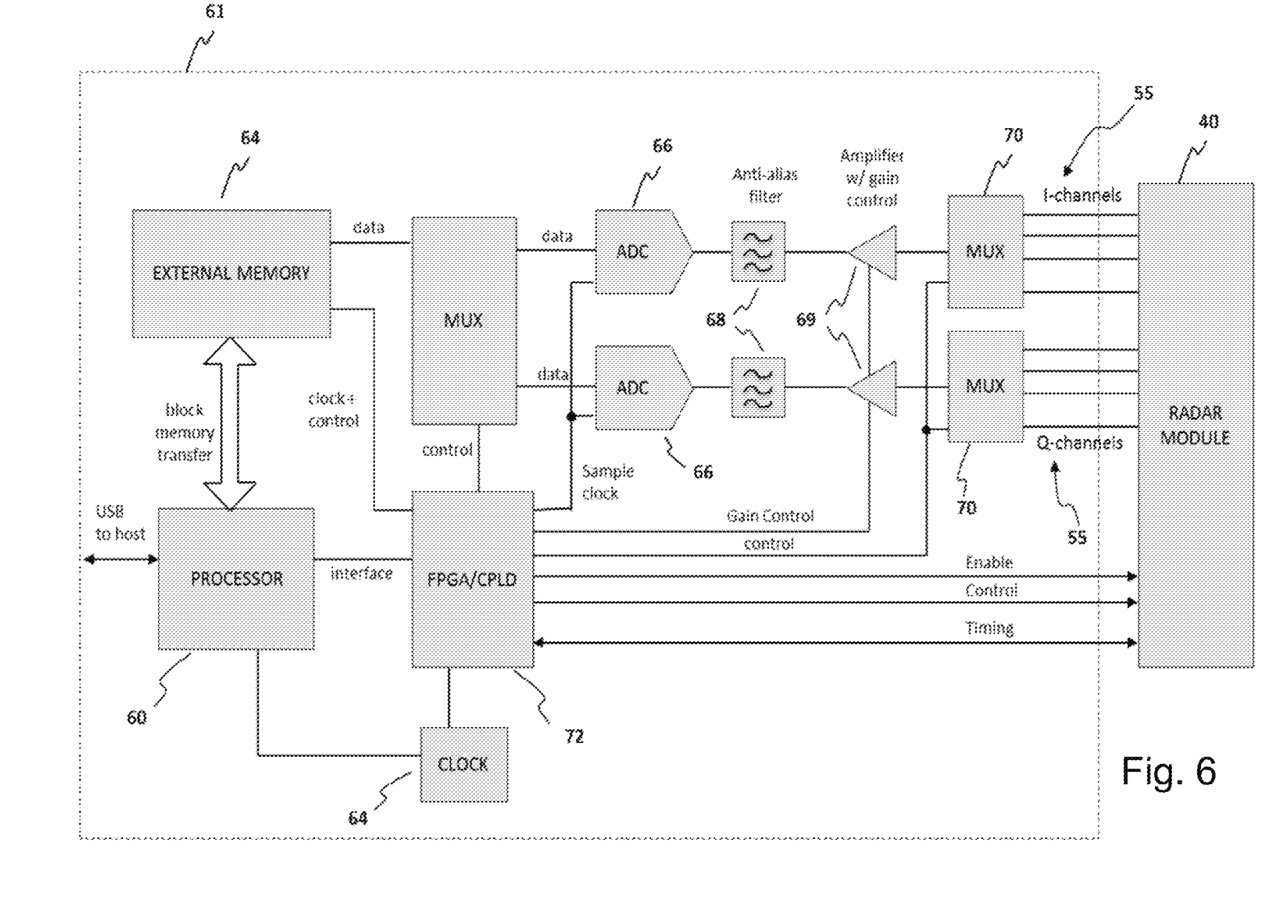
FIG. 6 is a system diagram of an exemplary radar processor.

Referring to FIG. 6, the radar processor unit generally includes a clock source 64 to provide a precision time base to operate processor, memory circuits and sampling clock for ADCs; a processor 60 responsible for configuration of the radar unit, processing raw radar data, and computing range solution; an external memory 62 which stores raw radar waveforms for processing and also stores calibration information and waveform correction; analog to digital converters 66; anti-aliasing filters 68 which are used to filter analog signal for lowpass (i.e. first Nyquist zone) or band pass (i.e. Intermediate Frequency IF) sampling; digital and analog mux electronics 70, and CPLD or FPGA 72 which coordinate timing of events. It is also possible to eliminate one of the quadrature channels and hence simplifying the receiver hardware 46 and eliminate a single ADC converter chain (elements 66, 68, 69 and 70) if a Hilbert transformer is used to impart a phase shift to the preserved signal chain and obtain the quadrature component necessary for complex signal processing. These processing techniques are well known and applicable to radar processing.

Figure 7:
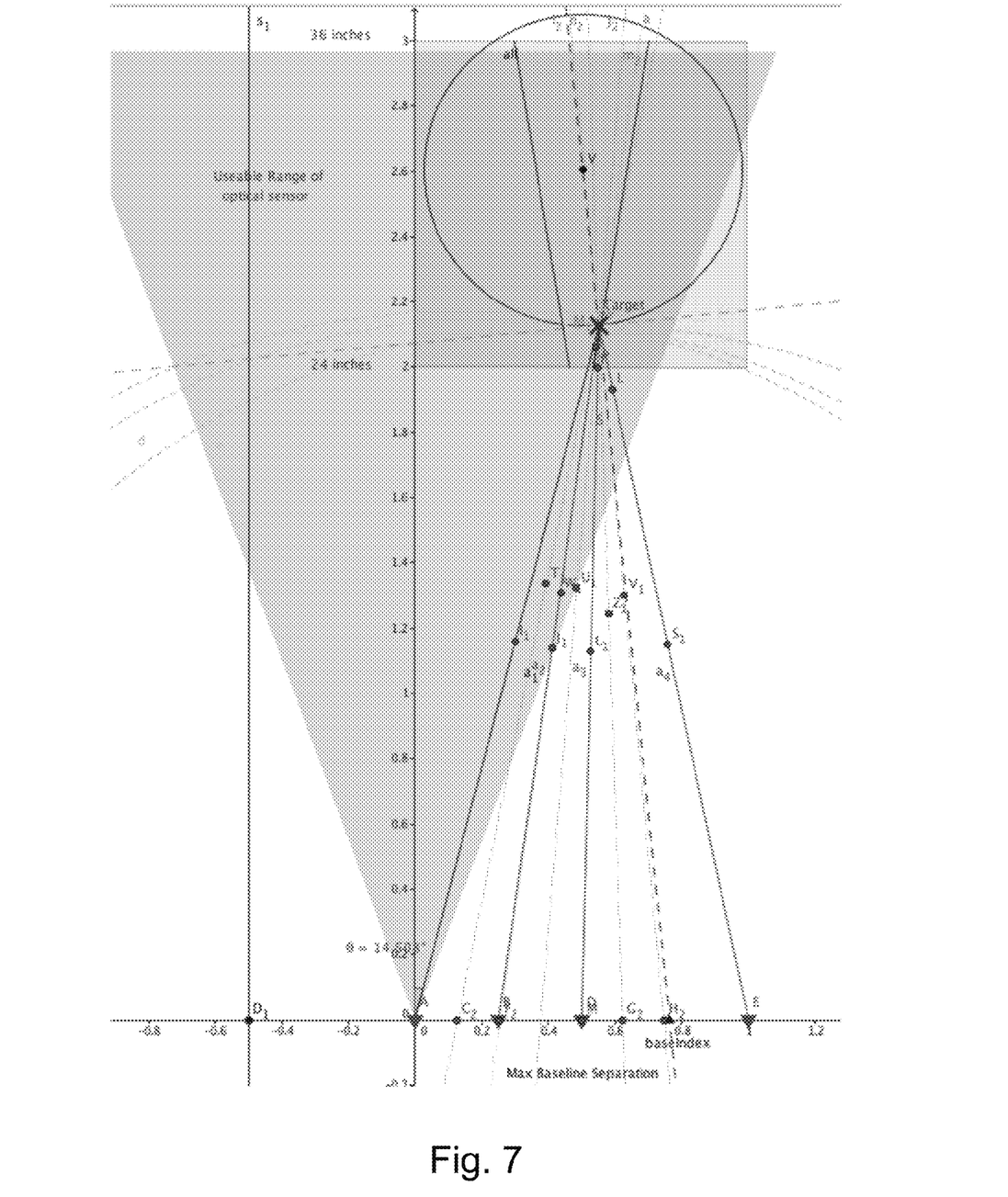
FIG. 7 is a schematic diagram illustrating a multilateration process for the antenna geometry with respect to the target.

For all combinations of antenna pairs 52, 54, a range determination can be made to the subject via the process of trilateration (for a pair) or multilateration (for a set) of elements. Referring to FIG. 7, with a target at an unknown distance in front of the sensor, the reflected waveform is mixed with a replica of the transmitted waveform and a beat frequency is produced. This beat frequency maps directly to the propagation delay of the ramping waveform. The resolution of the radar is determined by the bandwidth of the system and is $\delta r = c/(2 \cdot B)$. The total path length is resolved by performing a Fourier Transformation on the output of the LFM radar to extract the spectral frequency content. Alternative analysis techniques involve Prony's Method. The output of the Prony method is capable of extracting frequency, amplitude, phase as well as a damping parameter from a uniformly sampled signal. The utility of the Prony analysis allows parameter extraction in the presence of noise. Prominent spectral peaks indicate the round-trip distance to the various scattering surfaces. It is well established in the art how this processing is performed. Other methods may alternatively be utilized. For example, the radar system can also utilize a Side Scan Radar algorithm to determine the range information to the target. The Side Scan Radar algorithm can be used alone or in conjunction with trilateration.

Increased spatial resolution can be obtained by using the phase information available from a set of quadrature outputs from the deramp mixers. The details of the quadrature converter follow below.

For specific reflectors, the phase information may also be used to measure changes in range with high precision. As the reflecting surface moves though a given distance with respect to the radar, and assuming a linear frequency modulation waveform is used, the instantaneous beat frequency from the de-ramping mixer will steadily increase or decrease in the direction of a range bin accumulating a full $2\pi$ of additional phase for each $\lambda/2$ change in distance. This phase change can be described as follows:

$$\phi\_c = 2\pi \cdot r/(\lambda/2) = 4\pi r/\lambda,$$

The number of $\lambda/2$ cycles which subdivide the defined range bins can be calculated as follows:

$$n\_(\lambda/2) = (B \cdot \lambda)/(T\_m \cdot c) = 1/(T\_m) * (B/f)$$

where:

B="Swepth RF Bandwidth," $\lambda$="wavelength of center frequency," T_m="modulation period", c="speed of light in vacuum", f="center frequency of the radar"

The requirement placed on the waveform generator is that for a given range delay, a highly linear ramp must comprise a known portion of the waveform (ideally at the start of the pulse) such that a low-frequency beat is produced for a given reflector distance, for a duration long enough to ascertain a phase reading. After this period of linearity, the waveform may continue a linear sweep or any desired characteristic (parabolic, exponential, etc.). The phase tracking can be performed on any number of targets, so long as the velocity of the platform is slow enough so as to not exceed the spatial sampling ability of the platform. The instantaneous velocity which should not be exceed for any target needing to be tracked can be calculated as follows:

$$v\_(i,\max)=\lambda/(2\cdot n\cdot T\_m)=\lambda/2*1/(n*T\_m)$$

The unambiguous resolution bins of the system are determined by the bandwidth of the radar. The frequency resolution of the receiver is determined by the modulation period, so a LFM radar range resolution is a function of both chirp bandwidth and modulation period. For systems which inter-bin range will accumulate phase until one full cycle is registered, at which point the next range bin has been reached.

Figure 8:
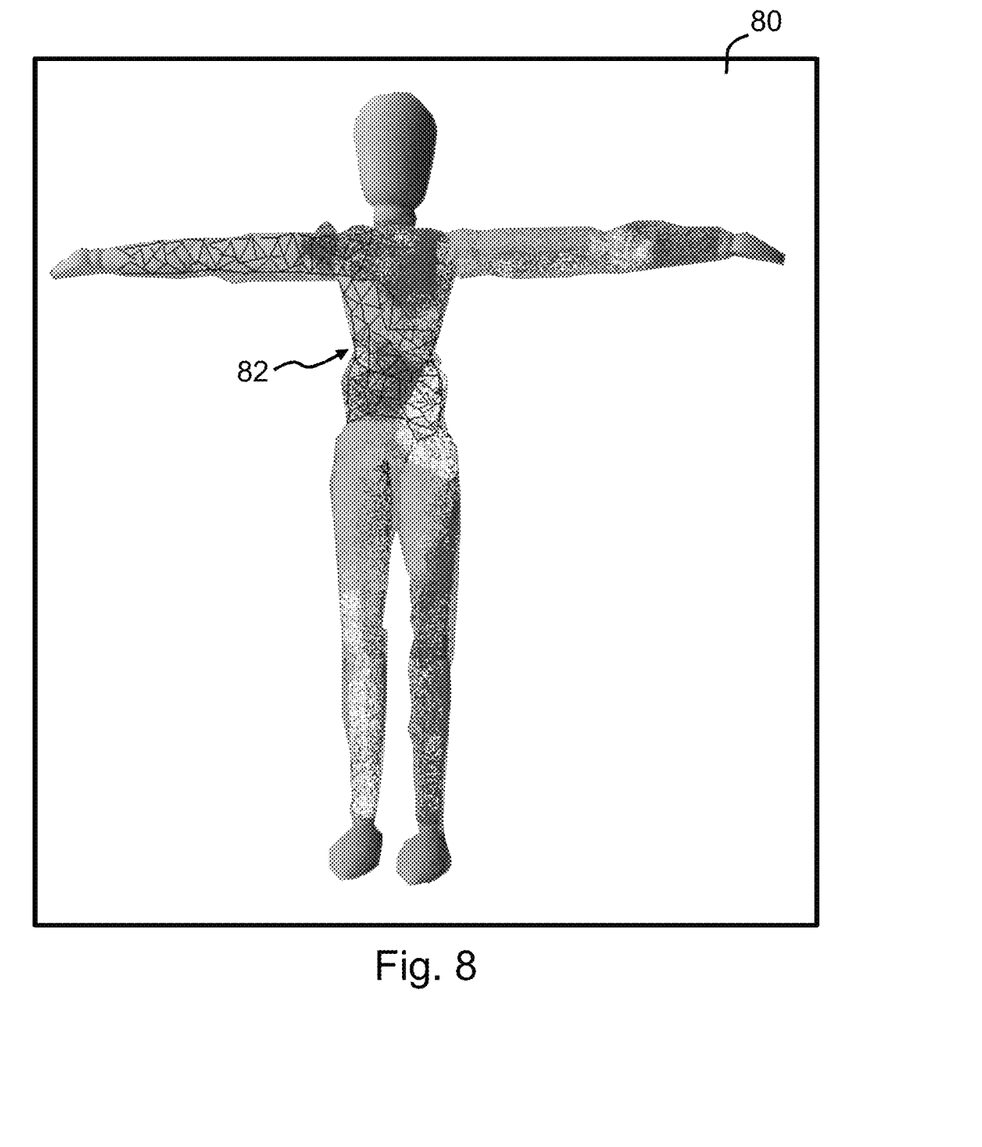
FIG. 8 is a perspective view illustrating a wire mesh mannequin and coverage map.

As the operator scans the individual, a display 80 is updated indicating the regions of coverage, as illustrated in FIG. 8. The operator will see a real-time update of the acquired scan with on-screen indications 82 where areas of the have been scanned and where the body may still need to be scanned. The display information is useful to assist the operator of the device to make sure that all surfaces of the body have been scanned. A simple embodiment of this concept is to show a silhouette of the body in black and white or gray scale to indicate the areas of the body that have been scanned.

In the exemplary application, the portable scanner will allow large volumes of fully clothed customers to be rapidly scanned and do so at a fraction of the cost of the existing kiosk-based scanner unit. A significant benefit of this technology is that the handheld unit will not be constrained in a fixed orientation with respect to the subject, so challenging measurements can be made to areas of the body which might otherwise be difficult to perform with a fixed structure. Additionally, the combination of two spatial measurement systems working cooperatively can provide a higher fidelity reproduction of the dimensionality of the individual.

While the invention is described herein in the context of an exemplary garment fitting application, it is recognized that the system may be utilized to determine size measurements for other irregularly shaped objects and used in other applications that utilize size measurements of an irregularly shaped object.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A handheld scanner system for obtaining sizing of an irregularly shaped object, the system comprising:
   a housing,
   an optical module including at least one 3D optical sensor configured to generate a 3D point cloud of information about the object;
   a radar module including at least one radar sensor configured to sense spacing between the housing and the object; and
   a processor which receives data from the optical module and the radar module and creates a map representing the object based on the received data.

2. The handheld scanner system according to claim 1 wherein the optical system provides range information of a visual surface of the object and the optical range information is utilized to provide a reference for the radar processing system to limit the range of the scan of the radar module to a surface of the object below the visual surface.

3. The handheld scanner system according to claim 2 wherein the object is an individual wearing a garment and the garment defines the visual surface and the individual's body defines the surface of the object below the visual surface.

4. The handheld scanner system according to claim 1 wherein the 3D point cloud is used to aid in resolving the radar data into the surface of said object below said visual surface.

5. The handheld scanner system according to claim 1 wherein the 3D point cloud is used along with statistical fitting for a variety of body types and refinement is obtained by incorporation of the radar ranging data.

6. The handheld scanner system according to claim 1 wherein the processor uses the 3D point cloud as a starting point to limit the solution sets of a radar trilateration algorithm to determine the dimensional information of an area of interest.

7. The handheld scanner system according to claim 1 wherein the processor utilizes a side scan radar algorithm to determine range information to the target.

8. The handheld scanner system according to claim 1 wherein the radar module operates in any band from 1 GHz to 1 THz.

9. The handheld scanner system according to claim 1 wherein each radar sensor includes an antenna having a transmitting element and a receiving element.

10. The handheld scanner system according to claim 9 wherein the processor is configured to dwell on one or more antenna combinations based on threshold criteria and the associated correspondence between optical and radar data.

11. The handheld scanner system according to claim 9 wherein the system includes at least four apertures, each of said apertures having an associated radar transmitting element and receiving element, said apertures having a relative spacing of 1:1:2.

12. The handheld scanner system according to claim 1 wherein the processor is configured to compute and maintain an inertial state vector to track movement of said scanner with respect to said object, using available sensor data from an inertial measurement unit.

13. The handheld scanner system according to claim 12 wherein the inertial state vector is further computed and maintained using data from one or more of the 3D optical sensors.

14. The handheld scanner system according to claim 1 wherein the system is configured to communicate with an external device for further processing.

15. The handheld scanner system according to claim 14 wherein the processor outputs the created map to said external device.

16. The handheld scanner system according to claim 1 wherein the housing defines a handle.

17. The handheld scanner system according to claim 1 wherein the system is configured to provide feedback to an operator.

18. The handheld scanner system according to claim 17 wherein the feedback is haptic, auditory, visual or a combination thereof.

* * * * *